United States Patent
Liu et al.

(10) Patent No.: US 12,154,253 B2
(45) Date of Patent: Nov. 26, 2024

(54) METHOD, DEVICE, AND STORAGE MEDIUM FOR REMOVING FALSE CONTOURS IN AN IMAGE

(71) Applicant: MONTAGE LZ TECHNOLOGIES (CHENGDU) CO., LTD., Sichuan (CN)

(72) Inventors: Chengqiang Liu, Sichuan (CN); Zhimin Qiu, Sichuan (CN); Youyuan Huang, Sichuan (CN)

(73) Assignee: MONTAGE LZ TECHNOLOGIES (CHENGDU) CO., LTD., Chengdu (CN)

( * ) Notice: Subject to any disclaimer, the term of this patent is extended or adjusted under 35 U.S.C. 154(b) by 486 days.

(21) Appl. No.: 17/506,693

(22) Filed: Oct. 21, 2021

(65) Prior Publication Data
US 2022/0130018 A1   Apr. 28, 2022

(30) Foreign Application Priority Data
Oct. 23, 2020   (CN) .......................... 202011146132.7

(51) Int. Cl.
*G06T 5/70*   (2024.01)
*G06T 5/20*   (2006.01)
*G06T 7/13*   (2017.01)

(52) U.S. Cl.
CPC ............... *G06T 5/70* (2024.01); *G06T 5/20* (2013.01); *G06T 7/13* (2017.01); *G06T 2207/20192* (2013.01)

(58) Field of Classification Search
CPC ...... G06T 5/70; G06T 5/20; G06T 7/13; G06T 2207/20192; G06T 7/12; G06T 2207/10016
See application file for complete search history.

(56) References Cited

U.S. PATENT DOCUMENTS

| | | | | |
|---|---|---|---|---|
| 2009/0304270 A1* | 12/2009 | Bhagavathy | ........... | H04N 1/409 382/162 |
| 2010/0040283 A1* | 2/2010 | Tsukioka | ........... | H04N 1/58 382/167 |

(Continued)

FOREIGN PATENT DOCUMENTS

| CN | 106656662 | * | 5/2017 | ........... H04L 41/145 |
|---|---|---|---|---|

OTHER PUBLICATIONS

Scott et al, (Decontouring: prevention and removal of false contour artifacts, SPIE, vol. 5292, 2004, pp. 130-149) (Year: 2004).*

*Primary Examiner* — Amara Abdi
(74) *Attorney, Agent, or Firm* — Jun He Law Offices P.C.; James J. Zhu (57) ABSTRACT

A method for removing false contours from a target image includes the following steps: A) receiving the target image having a two-dimensional pixel array arranged in rows and columns; B) performing a false contour detection on a target arrangement of the target image according to a target direction, wherein the target direction is one of the row direction or the column direction of the target image; C) predicting, based on at least a first band width of a first band, a second band width of a second band, in response to the detection of a false contour between the first band and the second band, wherein the first band and the second band are adjacent to each other in the target arrangement; and D) performing pixel interpolation processing on at least a part of pixels in the second band to remove the false contour.

25 Claims, 3 Drawing Sheets

(56) References Cited

U.S. PATENT DOCUMENTS

2010/0189349 A1* 7/2010 Miyasaki ............... H04N 1/409
   382/167
2011/0033171 A1* 2/2011 Hirota .................... H04N 5/21
   386/E9.056

* cited by examiner

METHOD, DEVICE, AND STORAGE MEDIUM FOR REMOVING FALSE CONTOURS IN AN IMAGE

CROSS REFERENCE TO RELATED APPLICATIONS

This application is based on and claims priority to Chinese Patent Application No. 202011146132.7 filed on Oct. 23, 2020, the entire content of which is incorporated herein by reference.

TECHNICAL FIELD

This application relates to the field of image processing technology, and more specifically, to a method, device, and storage medium for removing false contours in an image.

BACKGROUND

During video image processing, due to image compression and quantization errors, some false contours similar to an edge of an image may be generated in an originally relatively smooth area of the image, and an image area similar to a band may be formed between two false contours. Compared with actual image edges, false contours are usually of smaller differences and often appear in smooth areas of images, and human eyes are often more sensitive to false contours existing in such smooth areas, which leads to a decrease in the subjective perceptual quality of video images. In addition, in image enhancement processing, these false contours are also prone to be correspondingly enhanced, adversely affecting the objective quality of images.

Therefore, it is desired to provide a method for removing false contours in an image.

SUMMARY

An objective of the present application is to provide an image processing method that can identify and remove false contours from images.

In one aspect of this application, a method for removing false contours in a target image is provided, comprises: A) receiving the target image having a two-dimensional pixel array arranged in rows and columns; B) performing a false contour detection on a target arrangement of the target image according to a target direction, wherein the target direction is one of the row direction or the column direction of the target image; C) predicting, based on at least a first band width of a first band, a second band width of a second band, in response to the detection of a false contour between the first band and the second band, wherein the first band and the second band are adjacent to each other in the target arrangement; and D) performing pixel interpolation processing on at least a part of pixels in the second band to remove the false contour.

In some embodiments, step B comprises: determining a target pixel in the target arrangement; performing windowing processing on the target arrangement with a false contour detection window to obtain a set of neighboring pixels adjacent to the target pixel; determining a first difference parameter, wherein the first difference parameter indicates a degree of difference among individual pixels associated with the target pixel; determining a second difference parameter, wherein the second difference parameter indicates a degree of overall difference within the set of neighboring pixels or a degree of overall difference between the set of neighboring pixels and another set of neighboring pixels adjacent to a pixel at a preceding false contour; and determining whether the target pixel is located at a false contour of the target arrangement, at least based on the first difference parameter and the second difference parameter.

In some embodiments, determining the first difference parameter comprises: comparing between two neighboring pixels adjacent to the target pixel; or comparing between the target pixel and a next neighboring pixel of the target pixel in the target arrangement.

In some embodiments, determining the second difference parameter comprises: comparing between all neighboring pixels before the target pixel in the set of neighboring pixels and all neighboring pixels after the target pixel in the set of neighboring pixels.

In some embodiments, determining the second difference parameter comprises: comparing between a first cumulative value of all pixels in the set of neighboring pixels and a second cumulative value of all pixels in the set of neighboring pixels adjacent to the pixel at a preceding false contour.

In some embodiments, wherein determining whether the target pixel is located at a false contour of the target arrangement, at least based on the first difference parameter and the second difference parameter comprises: determining that the target pixel is located at a false contour of the target arrangement, when the first difference parameter falls within a first predetermined difference range and the second difference parameter falls within a second predetermined difference range.

In some embodiments, the false contour detection window is a window centered on the target pixel with a width of at least 5 pixels.

In some embodiments, step B comprises: determining a third difference parameter, wherein the third difference parameter indicates a maximum difference value of the set of neighboring pixels; and determining whether the target pixel is located at a false contour of the target arrangement, based on the first difference parameter, the second difference parameter and the third difference parameter.

In some embodiments, determining whether the target pixel is located at a false contour of the target arrangement, based on the first difference parameter, the second difference parameter and the third difference parameter comprises: determining that the target pixel is located at a false contour of the target arrangement, when the first difference parameter falls within a first predetermined difference range, the second difference parameter falls within a second predetermined difference range, and the third difference parameter does not exceed a predetermined difference threshold.

In some embodiments, the predetermined difference threshold is a self-adaptive threshold related to the target pixel.

In some embodiments, step C comprises: setting the first band width of the first band as a prediction value of the second band width of the second band.

In some embodiments, step C comprises: comparing the first band width with a reference band width; setting the first band width as a prediction value of the second band width, when the first band width is larger than the reference band width; and setting an average value of the first band width and the reference band width as the prediction value of the second band width, when the first band width is not larger than the reference band width.

In some embodiments, the reference band width is the prediction value of the first band width.

In some embodiments, step B comprises: performing windowing processing on the target arrangement with a false contour detection window to obtain a set of neighboring pixels adjacent to the target pixel; and determining a second difference parameter, wherein the second difference parameter indicates a degree of overall difference within the set of neighboring pixels; and step C further comprises: limiting a prediction value of the second band width based on the second difference parameter.

In some embodiments, step C further comprises: correcting a prediction value of the second band width with respective band widths of two bands in two arrangements adjacent to the target arrangement in a non-target direction of the row direction and column direction, wherein the two bands correspond to the first band in the target direction.

In some embodiments, the first band starts from a false contour or an image edge.

In some embodiments, the interpolation processing includes interpolation smoothing filtering processing.

In some embodiments, at least a part of pixels within the second band start from the target pixel but do not exceed ¾ of the prediction value of the second band width.

In some embodiments, after step D, the method further comprises: performing adjustment processing on interpolated pixels so that the difference between each interpolated pixel and a pixel before the interpolated pixel in the target arrangement does not exceed a predetermined difference threshold.

In some embodiments, the predetermined difference threshold is a self-adaptive threshold.

In some embodiments, in the step of the adjustment processing, applying different predetermined difference thresholds to pixels located in a smooth area of the target image and pixels located in a non-smooth area of the target image.

In some embodiments, an image processing device and a non-volatile computer storage medium are also provided.

It can be seen that when the method of the present application is used to process an image, the false contour in the image can be detected and relevant statistical information of the false contour can be obtained, and the width of the next neighboring band can be determined using the calculated width of the previous band at the false contour. In this way, the statistical information can be used to remove the false contour from the original image using interpolation smoothing filtering or other methods. Under the condition of achieving the same image effect, memory footprint can be reduced and the hardware cost of image processing is saved.

The above is an overview of the application, which may be simplified, summarized and omitted in detail. Therefore, those skilled in the art should realize that this part is only illustrative, and is not intended to limit the scope of the application in any way. This summary is neither intended to determine the key features or essential features of the claimed subject matter, nor is it intended to be used as an auxiliary means to determine the scope of the claimed subject matter.

BRIEF DESCRIPTION OF THE DRAWINGS

The above and other features of the present application will be more fully and clearly understood by combining the following description and the attached claims with the drawings. It should be understood that these drawings only depict a number of embodiments of the content of the present application, and thus they should not be considered as limiting the scope of the content of the present application. By using the drawings, the content of the present application will be illustrated more clearly and in detail.

DETAILED DESCRIPTION

In the following detailed description, reference is made to the drawings forming a part thereof. In the drawings, similar symbols generally denote similar components, unless the context indicates otherwise. The illustrative embodiments described in the detailed description, the drawings and the claims are not intended to limit the scope of the present application. Other embodiments may be adopted and other changes may be made without departing from the spirit or scope of the subject matter of the present application. It should be understood that various configurations, substitutions, combinations and designs of various aspects of the content of the present application, which are generally described in the present application and illustrated in the drawings, can be achieved, and all of these explicitly form a part of the content of the present application.

Figure 1:
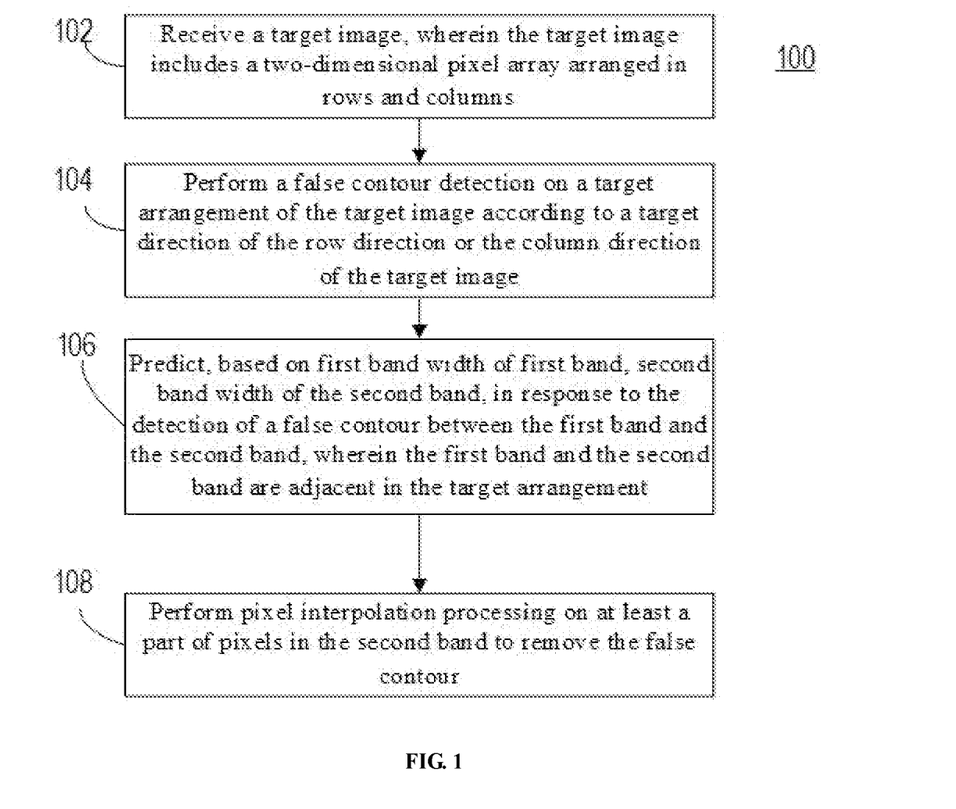
FIG. 1 illustrates a method for removing false contours from an image, according to an embodiment of the present application.

FIG. 1 illustrates a method for removing false contours in a target image, according to an embodiment of the present application. In some embodiments, the method can be used to process static images or dynamic images, such as video images, to remove false contours from these images.

Figure 2:
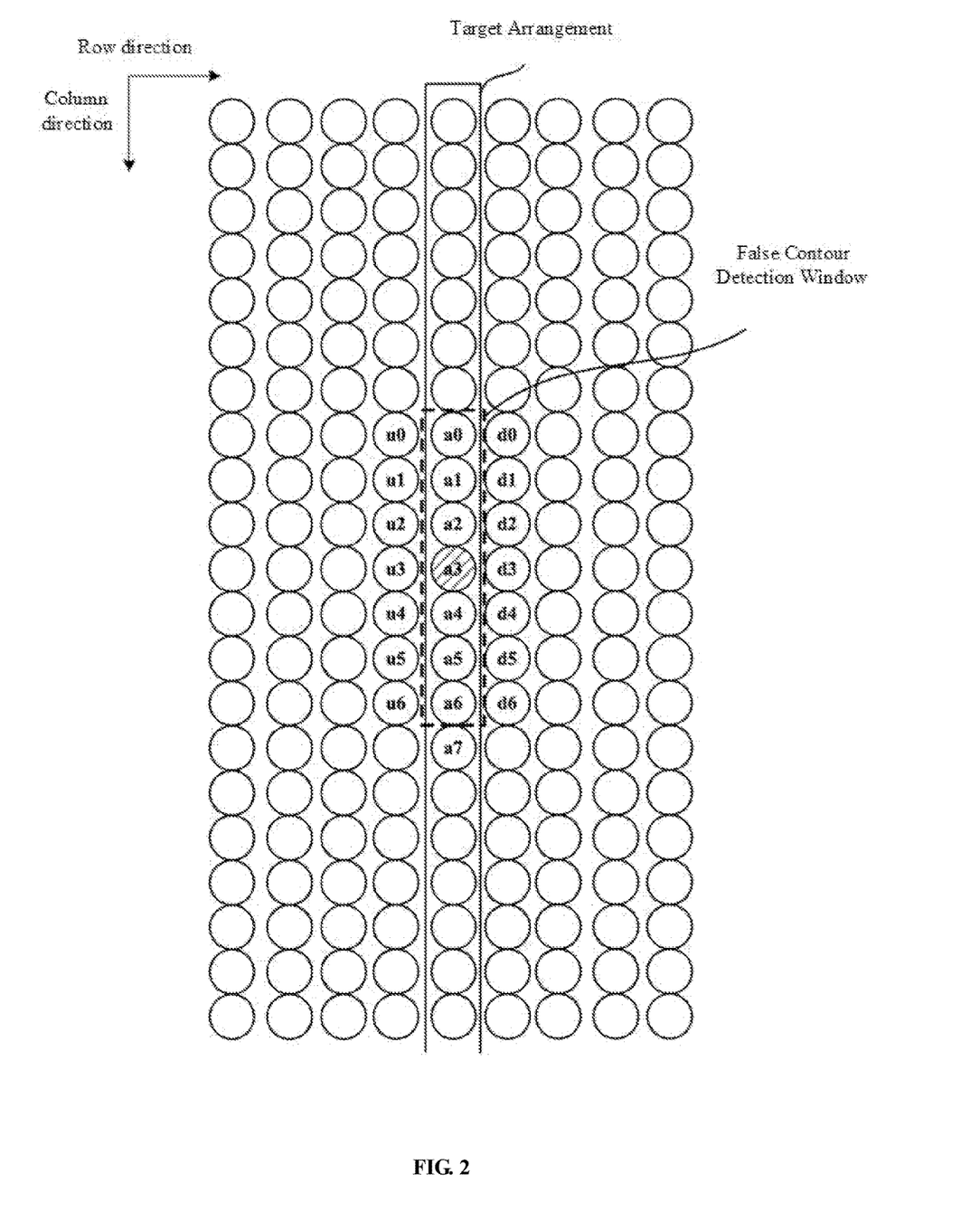
FIG. 2 illustrates an exemplary image that can be processed by the method illustrated by FIG. 1, the exemplary image including a two-dimensional pixel array of rows and columns.

FIG. 2 illustrates an exemplary image that can be processed by the method illustrated in FIG. 1, the exemplary image including a two-dimensional pixel array by rows and columns.

In the image shown in FIG. 2, there may be visually perceptible difference in the pixel values of two neighboring pixels in a row of pixels in a row direction or in a column of pixels in a column direction, but the difference is usually smaller than that of two neighboring pixels at an actual edge of the image. Therefore, false contour detection can be performed on the image row by row or column by column, and the image can be processed accordingly after a false contour is detected. For example, for the image illustrated in FIG. 2, false contour detection is performed on the image column by column, for example, the target arrangement being a column of pixels that is currently examined. It can be understood that the resolution of the image determines the number of pixels per row or the number of pixels per column, for example, a 1920*1080 image containing 1920 pixels per row and 1080 pixels per column. It should be noted that, in the present application, the target image to be processed can conform to various image formats, such as YUV or RGB format. For an image conforming to YUV format, a pixel value can be the value of any of the Y-channel, U-channel, and V-channel of the image. In some embodiments, detection and removal of false contours may be performed only on one channel of an image, such as the Y-channel; and in other embodiments, the detection and removal of false contours can also be respectively performed on multiple or all channels of an image. For an image conforming to RGB format, a pixel value can be the value of one or more channels of R-channel, G-channel, or B-channel.

Next, in combination with FIG. 1 and FIG. 2, the method for eliminating false contours in an image according to the embodiments of the present application will be illustrated in detail.

First, in step 102, a target image is received, the target image having a two-dimensional pixel array arranged in rows and columns. The target image is, for example, an image illustrated in FIG. 2.

Next, in step 104, false contour detection is performed on a target arrangement of the target image according to a target direction. The target direction may be one of the row direction or the column direction of the target image. For example, the detection can be performed according to a column direction (target direction) column by column to detect false contours in each column of pixels, as illustrated in FIG. 2. In the present application, a false contour can be located between two neighboring bands with visually perceptible differences, and the difference is smaller than an obvious difference at the edge of the image. Within each band, pixel values are generally the same or similar among all pixels or at least between every two neighboring pixels.

Because a false contour is usually a local characteristic of an image, to process the present target arrangement by performing the false contour detection, it is not desired to obtain the information of all the pixels in the target arrangement at one time, and it is only desired to obtain the information of a part of the pixels in the target arrangement and of several pixels adjacent to a certain pixel. Therefore, for the target arrangement shown in FIG. 2, for example, it is possible to detect whether each pixel is at a false contour pixel by pixel in the column direction. In an embodiment, one target pixel in the target arrangement can be selected, such as the target pixel a3 in FIG. 2. After that, a false contour detection window can be used for windowing the target arrangement to obtain a set of neighboring pixels adjacent to the target pixel and including the target pixel (in the present application, the set of neighboring pixels adjacent to the target pixel includes the target pixel itself), such as the set of neighboring pixels, a0 to a6, in FIG. 2. Then, based on the information of the set of neighboring pixels, it can be detected whether the target pixel is at the false contour of the target arrangement in which the target pixel is located. It can be understood that, after target pixel a3 is examined, subsequent pixel a4 can be regarded as a new target pixel, and a plurality of pixels adjacent to the new target pixel can be selected to be processed in a similar manner. It can be understood that the false contour detection window defines the number and position of neighboring pixels that correspond to the target pixel. In FIG. 2, the false contour detection window is a window with a length of 7 (pixels) and is centered on target pixel a3. In other embodiments, the false contour detection window may be a window centered on a target pixel and with a length of at least 5 (e.g., 5, 6, 7, 8, 9, 10, 11 or more pixels). In other embodiments, the false contour detection window may not be centered at the target pixel. For example, in an alternative embodiment, the false contour detection window can also obtain a set of pixels, a0 to a7 which are adjacent to target pixel a3 in FIG. 2 to perform false contour detection. Those skilled in the art can increase or adjust the size and range of the false contour detection window according to the needs of practical application.

In some embodiments, one or more difference parameters may be determined based on a set of neighboring pixels obtained by the false contour detection window, wherein the difference parameters can indicate pixel differences associated with the target pixel and/or within the set of neighboring pixels. Based on the difference parameters, whether the target pixel is at the false contour of the target arrangement can be further determined.

In an embodiment, the one or more determined difference parameters may include a first difference parameter to indicate the degree of differences of individual pixels that are related to the target pixel. Referring to FIG. 2, still taking target pixel a3 as an example, the first difference parameter can be the difference between target pixel a3 and subsequent pixel a4 in the same arrangement (in the present application, unless otherwise specified, the difference is absolute value), or the difference between subsequent pixel a4 of target pixel a3 and previous pixel a2 of target pixel a3. If the target pixel is at a false contour, the first difference parameter should fall within a predetermined difference range, which can be denoted by the first predetermined difference range for convenience of explanation. Specifically, the first predetermined difference range should have a lower threshold of difference and an upper threshold of difference, wherein the lower threshold of difference cannot be too large, for example, the typical value of which is 1 (assuming that the pixel value is represented as an 8-bit depth value of 0-255), otherwise it will be difficult to detect the actual false contour. However, the upper threshold of difference cannot be too large either, for example, a typical value of which is 6 (also assuming that the pixel value is represented as an 8-bit depth value of 0-255). This is because that if the upper threshold of difference is too large, the image edge may be falsely detected as a false contour. In general, if the difference between the pixel values of neighboring pixels exceeds 8, it can be determined that the target pixel is located at the actual image edge. In practical application. The actual range of the first predetermined difference range may vary slightly with the calculation method of the first difference parameter. It should be noted that, in the following, pixel values are exemplarily represented by 8-bit depth values for illustration purpose, but those skilled in the art can understand that depth values of other bits (e.g., 10-bit) can be configured with corresponding pixel values and thresholds. For example, for the pixel value of 8-bit depth value, the upper threshold of difference of the first predetermined difference range is 6; for the pixel value of 10-bit depth value, the upper threshold of difference of the first predetermined difference range can be about 24, namely, 6*4, wherein the multiplication factor of 4 is due to the increase of 2 bits in the depth value of the pixel, and so on.

It can be understood that since the calculation of the first difference parameter is only related to the target pixel and one or two pixels adjacent to it, the first difference parameter may not indicate the overall difference information of the set of neighboring pixels. Accordingly, in some embodiments, the difference parameters determined may also include the second difference parameter to indicate the degree of the overall difference within the set of neighboring pixels. In some embodiments, the second difference parameter may be determined by comparing the differences between all neighboring pixels before the target pixel in the set of neighboring pixels and all neighboring pixels after the target pixel in the set of neighboring pixels. For example, the second difference parameter may be calculated as the difference between the cumulative value of the pixels of the upper/first half of the false contour detection window (for example, pixel a0+a1+a2 in FIG. 2) and the cumulative value of pixels of the lower/second half (for example, pixels a4+a5+a6 in FIG.

2) of the false contour detection window. Alternatively, the second difference parameter may also be calculated as the difference between the average of pixels of the upper/first half of the false contour detection window and the average of pixels of the lower/second half of the false contour detection window. When the target pixel is at the false contour, the second difference parameter should also fall within a predetermined difference range, such as a second predetermined difference range with a lower threshold of difference and an upper threshold of difference. In some embodiments, the second difference parameter may be calculated as a cumulative value of pixels of the upper/first half of the false contour detection window, then the lower threshold of the second predetermined difference range may be set as 4, and the upper threshold of the second predetermined difference range may be set as 24 (for example, in FIG. 2, the upper threshold and lower threshold both correspond to the difference between the cumulative value of the three pixels a0+a1+a2 of the upper half and the cumulative value of the three pixels a4+a5+a6 of the lower half). It can be understood that the specific values of the upper/lower threshold of the second predetermined difference range may vary depending on the calculation method of the second difference parameter.

Alternatively, the second difference parameter may also indicate the degree of the overall difference between the set of neighboring pixels corresponding to the target pixel and the set of neighboring pixels adjacent to the pixel at a previous false contour. For example, the second difference parameter can be calculated as the difference between the cumulative value of pixels of a set of neighboring pixels related to the target pixel currently being examined and the cumulative value of pixels of a set of neighboring pixels adjacent to the pixel at the previous false contour (obtained based on a false contour detection window of the same size). If the second difference parameter exceeds a predetermined lower threshold, it indicates that the target pixel is at the false contour, and thus the second difference parameter similarly corresponds to the overall difference between the pixel values of two neighboring bands; similarly, the second difference parameter should be less than the predetermined upper threshold, because if the second difference parameter is too large, the actual image edge will be falsely recognized as a false contour.

In some embodiments, whether the target pixel is at the false contour of the target arrangement can be determined based on the determined first difference parameter and the determined second difference parameter. Specifically, if the first difference parameter falls within the first predetermined range and the second difference parameter falls within the second predetermined range, the target pixel is determined to be located at the false contour of the target arrangement; Otherwise, it is determined that the target pixel is not at the false contour.

In some embodiments, other difference parameters related to the target pixel may also be calculated and whether the target pixel is at a false contour may be determined based on the first difference parameter, the second difference parameter and other difference parameters. For example, a third difference parameter may be determined, and the third difference parameter may indicate the maximum difference value of the set of neighboring pixels that corresponds to the target pixel, that is, the difference between the maximum and the minimum values of pixels in the set of neighboring pixels. In general, the maximum difference value cannot be too large, for example, it should not exceed a predetermined threshold, which, for example, is set as 2 to 20. In some preferred embodiments, the predetermined threshold corresponding to the maximum difference value can be a self-adaptive threshold that varies with the pixel value of the target pixel. It is understood that the greater the pixel value (brighter) of the target pixel, the greater the predetermined threshold can be.

Referring still to FIG. 1, in step 104, if the related calculation result for the currently processed target pixel indicates that the target pixel is not at a false contour, the process can move backwards to the subsequent neighboring pixel, to repeat the detection operation of whether the pixel is at the false contour. However, if it is detected that the current pixel is at the false contour, it is desired to remove the false contour from the target image, that is, to adjust the pixel value of the target pixel adjacent to the pixel at the false contour and one or more pixels adjacent to the target pixel, so as to make the transition of the pixel values of regions adjacent to the target pixel more natural and reduce or avoid the visual discomfort caused by the false contour.

Next, in step 106, in response to detection of a false contour between the neighboring first band and second band in the target arrangement, the second band width of the second band can be predicted based on at least the first band width of the first band before the false contour.

As mentioned above, the false contour determined by the present detection is located between the neighboring first band and second band in the target arrangement. Therefore, the width of the first band can be calculated by comparing the position of the present pixel (the present false contour) with the position of the previous false contour. In other words, the first band can start from the previous false contour and end at the present false contour. Generally, for the two neighboring bands in the same image, their widths may not be significantly different from each other, and thus the width of the unknown subsequent band (i.e., the second band) of the two neighboring bands can be predicted based on the known width of the previous band (i.e., the first band) of the two neighboring bands. The so-called unknown band refers to a band with a known starting position (i.e., the position of the present false contour), but the end position of such band (i.e., the position of the next false contour) cannot be or has not been determined.

In some embodiments, the first band width of the first band can be used as a prediction value of the second band width of the second band. Due to image noises and other reasons, the detection of false contours may be inaccurate, and, specifically, a pixel that is relatively close to the previous false contour may be detected as a false contour, and thus the width of the first band may be mistakenly shortened. In order to avoid errors caused from interference introduced by image noises or other interferences, in some preferred embodiments, the second band width of the second band can be predicted by the following method. First, the first band width is compared with the reference band width; and when the first band width is greater than the reference band width, the first band width is set as the prediction value of the second band width, and when the first band width is not greater than the reference band width, an average value of the first band width and the reference band width is set as the prediction value of the second band width. The reference band width can be set as the prediction value of the first band width. The prediction value can be determined when the false contour prior to the presently detected false contour is being detected and recognized, which can be saved for subsequent processing. It can be understood that the prediction of the first band is relevant to a band prior to the first band, and the prediction value of the first band width is also predicted according to the actual width of the previous band, and the width difference of two or more neighboring bands in the same arrangement may not be significant. Therefore, predicting the second band width by taking the prediction value and the actual value of the first band width into account can reduce the interference and influence of noise interferences on the subsequent band width prediction.

In some embodiments, when predicting the band width of the second band, the prediction value of the band width can also be limited. In other words, the predicted second band width should not be too large. There are two reasons for limiting the predicted value of band width. On one hand, less hardware and storage resources can be used to store information in the actual processing; on the other hand, the results of interpolation calculation can be more consistent with the actual changes of the image in the subsequent interpolation processing to remove false contours (see below), because interpolation is performed on at least a part of the pixels in the second band. In an example, the prediction value of the second band width may be limited based on the second difference parameter indicating the overall degree of difference within a set of neighboring pixels. For example, an upper threshold of the prediction value of the second band width may be 3 to 6 times of the second difference parameter (as mentioned above, assuming that the pixel value is an 8-bit depth value, regardless of the units of the two parameters).

It can be understood that, in some cases, the target pixel is detected at an edge of the image, such as when any of the first difference parameter, the second difference parameter, or the third difference parameter exceeds its corresponding upper threshold. In this situation, the neighboring area before the target pixel cannot be regarded as a band, and thus information used to predict the width of the second band can be reset. This method can avoid saving wrong information for subsequent false contour removal calculation. It can be understood that, when the calculation is performed again after reset, especially when the width of the first band is determined, the first band can start at the edge of the image and end at the current false contour.

In some cases, in addition to using the band width of the first band in the target arrangement to predict the band width of the second band, the band width of the second band can be predicted or corrected by using a band that is adjacent to the first band or a band close to the position of the first band in the original image. These neighboring bands can be located in two arrangements adjacent to the target arrangement in a non-target direction (in the example shown in FIG. 2, the—non target direction is the row direction). For example, in the example shown in FIG. 2, the column in which pixels u0 to u6 are located and the column in which pixels d0 to d6 are located are two arrangements adjacent to the target arrangement. It can be understood that, depending on the actual pixel values of the column in which pixels u0 to u6 are located, and the actual pixel values of the column in which pixels d0 to d6 are located, the start and/or end positions of the bands corresponding to the first band may not be aligned with the start and/or end positions of the first band, and the bands may have a width different from the first band width. For example, the band corresponding to the first band in the column in which pixels u0 to u6 are located may end at u2 (i.e., u2 is recognized as a false contour), and the target pixel a3 in the first band can be recognized as a false contour, and thus u2 is the pixel, which is recognized as a false contour, closest to the target pixel a3 in the column in which pixels u0 to u6 are located; the band corresponding to the first band in the column in which pixels d0 to d6 are located may end at d0, which is also a pixel above the target pixel a3 that is closest to a3.

In one example, considering the width of the neighboring bands in the neighboring arrangements, the prediction value of the second band width, i.e., band2_width, can be corrected by the following equation (1):

$$band2\_width = (band\_width\_u + 2*band1\_width + band\_width\_d)/4 \quad (1)$$

Where band1_width denotes an actual width of the first band, band width u represents an actual width of the band corresponding to the first band in the column in which pixels u0 to u6 are located, and band_width_d represents an actual width of the band corresponding to the first band in the column in which pixels d0 to d6 are located. It can be understood that, although the three bands are in different columns, they usually have the same or similar image characteristics because they are adjacent to each other in the row direction, and thus the prediction value of the width of the band in the target arrangement that is currently processed can be corrected based on the band widths of the bands in the neighboring non-target arrangements. It can be understood that in some other embodiments, the prediction value of the band width of the currently processed band in the target arrangement can also be corrected based on the band widths of the bands in more neighboring non-target arrangements.

Referring back to FIG. 1, next, in step 108, pixel interpolation can be performed on at least a part of the pixels in the second band to remove the false contour. It can be understood that the second band described here is the predicted range of the second band.

Figure 3:
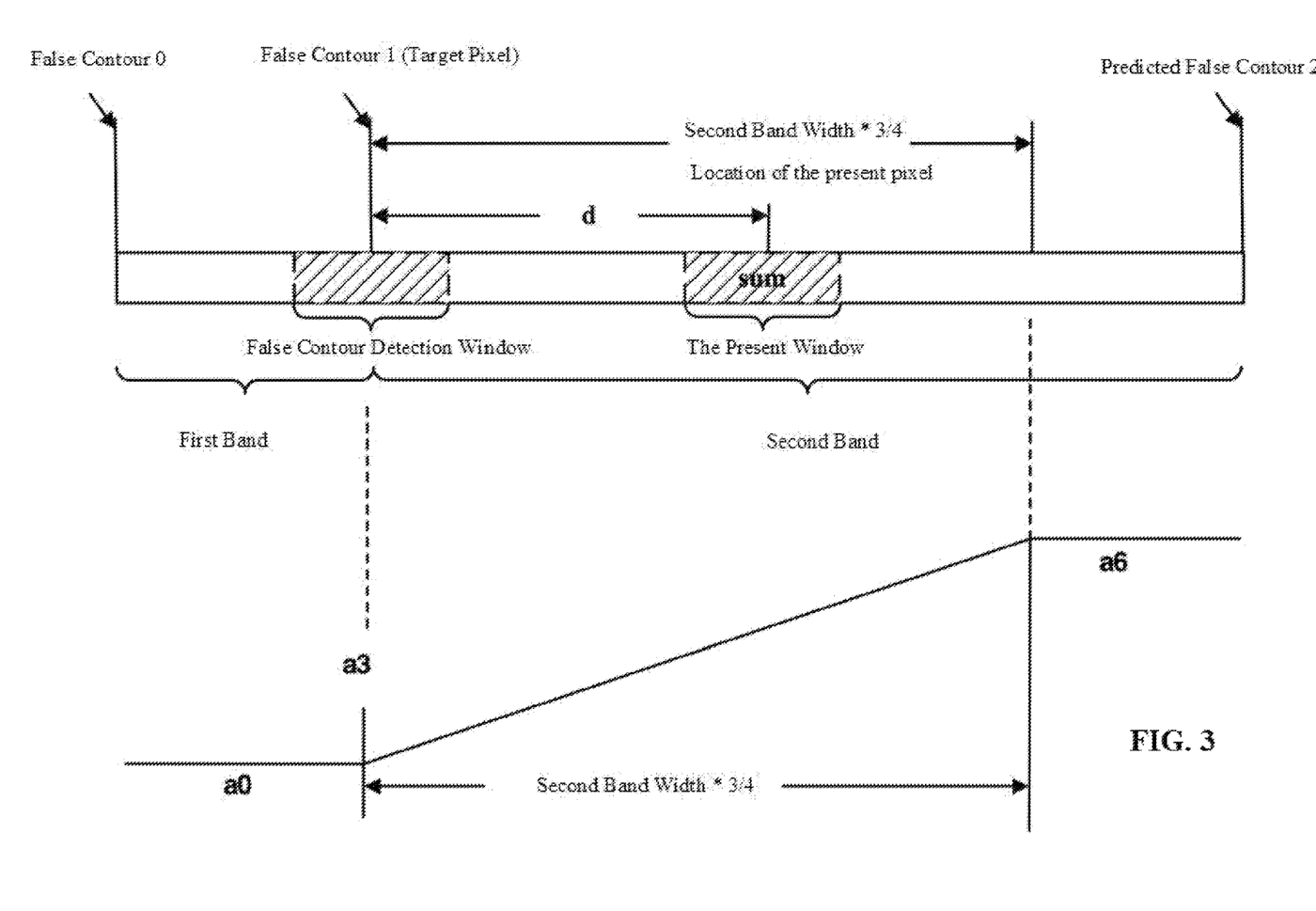
FIG. 3 illustrates a diagram illustrating the method of performing pixel interpolation processing on the target arrangement.

FIG. 3 shows a diagram of pixel interpolation processing on the target arrangement. As shown in FIG. 3, based on the information of the pixels obtained by the false contour detection window, it can be determined that the target pixel is located at a false contour 1. Accordingly, pixel interpolation processing can be performed on a second band starting from the false contour 1 and having a width equal to the predicted second band width, wherein the second band is predicted to end at a predicted false contour 2.

In some embodiments, pixel interpolation processing can be performed on all pixels in the second band; however, in other embodiments, only a part of the pixels in the second band would be interpolated. In the example shown in FIG. 3, pixels within a range starting from the target pixel (at the false contour 1) but not exceeding ¾ (75%) of the prediction value of the second band width may be interpolated. It can be understood that, in some other examples, pixel interpolation processing can also be performed on pixels within a range of other ratios of the prediction value of the second band width, such as 60%, 70%, 80%, 85%, 90%, 95% or higher. The pixel interpolation processing can make the pixel values of the interpolated pixels in the first band gradually change from the pixel value of the first band to or close to the pixel value of the second band. Since the second band is of substantially the same or similar pixel value, the pixel value of the second band can be represented by the pixel value of the target pixel located at the false contour (that is, between the first band and the second band).

In some embodiments, pixel interpolation can be implemented using interpolation smoothing filtering. Preferably, a linear interpolation smoothing filtering algorithm can be used to implement the pixel interpolation processing. Specifically, with reference to FIGS. 2 and 3, for the example of performing pixel interpolation processing on pixels within the range of ¾ (75%) of the prediction value of the second band width, a pixel value P of the interpolated pixel with a distance d from the target pixel may be represented by the following equation (2):

$$P = band1\_avg * (3/4 * band2\_width - d) + \qquad (2)$$
$$sum * d / (3/4 * band2\_width * win\_width)$$

Where band1_avg represents an average pixel value of the pixels in the first band, which, in some embodiments, can be represented by the pixel value of pixel a0 (referring to FIG. 2, assuming that the target pixel a3 is at the false contour 1); band2_width is the prediction value of the second band width, sum is an average pixel value of the pixels in the current interpolation processing window, and in some embodiments, band1_avg can be represented by the pixel value of pixel a6 (referring to FIG. 2, assuming that the target pixel a3 is at the false contour 1); d represents a distance between the current pixel and the false contour 1; win_width represents a width of the window (i.e. the current interpolation processing window) where the current pixel is located, e.g., the value of win_width being 7. It can be understood that in the preferred embodiment, the average of the pixel values of multiple pixels can be used in the interpolation processing, which can make the transition between bands smoother.

It should be noted that the interpolation processing method described in equation (2) is only an example. In some other embodiments, the pixel values of some or all pixels in the predicted second band range can also be calculated using other interpolation algorithms.

It can be understood that, based on the method shown in FIG. 1, the false contour in the image can be recognized and removed by interpolation processing. In the processing, this method can not only recognize false contours, but also detect other non-false-contour regions in the image, such as edges in the image. For the pixels in the non-false-contour regions, if they are at an edge of the image, the original pixel value of the pixel can be directly output without interpolation or adjustment. During certain processing, when the distance between two false contours is relatively small, that is, when the band width defined by the two false contours is relatively small, other alternative interpolation processing algorithms such as mean filtering can be used instead of the interpolation smoothing filtering to remove the false contours.

In some embodiments, after being processed according to the above embodiments of the present application, the pixel value of a pixel of the obtained image may change significantly compared with the pixel value of the previous pixel adjacent to it in the same arrangement, which can be called adjustment. In some embodiments, the adjustment can be performed on the processed image to avoid unexpected large change of pixel values in the image after being processed. Specifically, the step of adjustment can be added after step 108 as shown in FIG. 1. In this step, when the change of pixel value between a certain pixel and a neighboring pixel exceeds a predetermined or self-adaptive difference threshold, adjustment can be performed on the pixel value of the pixel.

It can be understood that for different regions in the image, the adjustment algorithm that is actually applied may change. If the current pixel is located in a smooth area where false contour removal is needed, a relatively small difference threshold (delta_th1) can be applied when adjustment limitation processing is performed on it. At this time, if the difference between the pixel value of the current pixel (obtained based on the interpolation algorithm) and the pixel value of the previous pixel (the pixel value after the false contour is removed) in the same arrangement (in the same row or column) is greater than the difference threshold delta_th1, adjustment can be performed on the current pixel; and if the difference does not exceed the difference threshold delta_th1, the pixel value obtained by interpolation can be used without adjustment. In some embodiments, the difference threshold delta_th1 can be a self-adaptive threshold, and, for example, its value may range from 1 to 4.

On the other hand, for the pixels in the actual edge region of the image, the amount of amplification may be larger than that of the previous pixel in the same row or column. Therefore, a larger difference threshold (delta_th2) can be used in adjustment limitation. At this time, if the difference between the pixel value of the current pixel (obtained based on the interpolation algorithm) and the pixel value of the previous pixel (the pixel value after the false contour is removed) in the same arrangement (in same row or column) is greater than the difference threshold, delta_th2, adjustment can be performed on the current pixel; if the difference does not exceed the difference threshold, delta_th2, the pixel value obtained by interpolation can be used without adjustment. In some embodiments, the difference threshold, delta_th2, which can be applied to the edge region may be greater than the difference threshold, delta_th1, which can be applied to the smooth area, which, for example, may range from 1 to 6.

In practical applications, the edge region usually includes different pixels with significant differences, and the differences between the pixel values of these different pixels after interpolation processing may actually be relatively large. Therefore, the adjustment may not necessarily be performed on all the pixels in the edge region according to the above determination method, or at least whether the adjustment is needed does not rely on the difference threshold delta_th2 alone, but also rely on the pixel value difference between different pixels before interpolation processing. Accordingly, in some preferred embodiments, if both the difference between the current pixel and its previous pixel and the difference between the current pixel and its subsequent pixel in the original image is less than a reference threshold delta_th (which means that there is no obvious difference between the pixel values of the current pixel and the neighboring pixels), but when the difference between the pixel values of the current pixel after interpolation calculation and the previous pixel is greater than the increase threshold (delta_th2), it means that the interpolation processing may improperly increase the difference between the pixel values of the current pixel and its previous pixel, and thus it is desired to correct the pixel value of the current pixel. Reference threshold delta_th can be equal to or greater than delta_th2, where these two thresholds are custom thresholds, and their values, for example, may range from 2 to 6.

Similarly, for a part of pixels outside the smooth area of the non-edge regions, that is, if a false contour has not been detected when the current pixel is being processed, or the pixels before the current pixel in the same arrangement are detected at an edge of the image, or for the current pixel (that is, it is detected that the current pixel is at the false contour), the band width calculated is relatively small, then if it is further determined that the difference between the pixel value of the current pixel and the actual pixel value of the previous pixel after correction is greater than the difference threshold value delta_th1, adjustment needs to be performed on the pixel value of the current pixel. In some embodiments, the difference threshold delta_th1 can also be a self-adaptive threshold, for example, its value may range from 1 to 4.

In some embodiments, the correction of the pixel values of pixels in the smooth area may be calculated by the following equations (3) to (6):

$$\text{delta\_value1} = (\text{data\_out\_tmp} - \text{prev\_output})/6 \quad (3)$$

$$\text{delta\_value} = \text{delta\_value1} + \text{prev\_delta} \quad (4)$$

$$\text{data\_out} = INT(\text{prev\_output} + \text{delta\_value}) \quad (5)$$

$$\text{prev\_delta} = FRA(\text{prev\_output} + \text{delta\_value}) \quad (6)$$

Where data_out_tmp represents the pixel value of the current pixel obtained by interpolation; prev_output represents the pixel value of the previous pixel of the current pixel; prev_delta represents the fractional part of the corrected amount of adjustment of the previous pixel, delta_value represents the corrected amount of adjustment of the current pixel, data_out represents the corrected pixel value of the current pixel, INT represents taking integer part, FRA represents taking the decimal part, and data_out represents an integer value. When the current pixel does not meet the condition of adjustment, both delta_value and prev_delta are set as 0.

In some embodiments, the correction of the pixel values of pixels in the non-smooth area may be calculated by the equations (4), (5), (6), and (7).

$$\text{delta\_value1} = (\text{data\_out\_tmp} - \text{prev\_output})/4 \quad (7)$$

Equation (3) is similar to equation (7) except that the calculation method of delta_value1 is slightly different. This is because the change of pixel values of pixels in the smooth area is relatively small, and thus the smaller the value is, the smoother the output is.

It can be seen that, through adjustment, the difference between pixel values of neighboring pixels in the interpolation can be effectively adjusted, which makes the processed image transit naturally.

In some embodiments, the application also provides some computer program products, which include a non-volatile computer-readable storage medium. The non-volatile computer-readable storage medium includes computer executable code for performing the steps in the method embodiment shown in FIG. 1. In some embodiments, the computer program product may be stored in a hardware device, such as an image processing device.

It can be seen that when the method of the present application is used to process ah image, the false contour in the image can be detected and relevant statistical information of the false contour can be obtained, and the width of the next neighboring band can be determined using the calculated width of the previous band at the false contour. In this way, the statistical information can be used to remove the false contour from the original image using interpolation smoothing filtering or other methods. Under the condition of achieving the same image effect, memory footprint can be reduced and the hardware cost of image processing is saved.

The embodiment of the invention can be realized by hardware, software, or combining hardware with software. The hardware part can be realized by using special logic; the software part can be stored in memory and executed by an appropriate instruction execution system, such as a microprocessor or a special design hardware. Ordinary technicians in the art can understand that the above-mentioned devices and methods can be implemented using computer executable instructions and/or contained in processor control codes, for example, the codes being provided on carrier media such as disks, CDs or DVD-ROM, programmable memory such as read-only memory (firmware), or data carriers such as optical or electronic signal carriers. The equipment and its modules can be realized by hardware circuits of such as VLSI or gate array, semiconductor such as logic chip, transistor, or programmable hardware equipment such as field programmable gate array and programmable logic device, or can be realized by software executed by various types of processors, and can also be realized by the combination of the hardware circuit and software, such as firmware.

It should be noted that although several steps and sub-steps of the method and modules and submodules of the device for removing false contours in images are mentioned in the detailed description above, such division is only exemplary rather than mandatory. In fact, according to an embodiment of the present application, the features and functions of two or more modules described above may be specified in one module. On the contrary, the features and functions of one module described above can be further divided into multiple modules to be specific.

A person skilled in the art may understand and implement other changes to the embodiments of the application by studying the description, the disclosed contents, the drawings and the attached claims. In the claims, the words "including" do not exclude other elements and steps, and the words "a" and "one" do not exclude the plural. In the practical application of the present application, one part may perform the functions of multiple technical features cited in the claims. Any reference mark in the claim shall not be interpreted as a limitation on the scope.

What is claimed is:

1. A method for removing false contours in a target image, wherein the method comprises:
   A) receiving the target image having a two-dimensional pixel array arranged in rows and columns;
   B) performing a false contour detection on a target arrangement of the target image according to a target direction, wherein the target direction is one of the row direction or the column direction of the target image;
   C) predicting, based on at least a first band width of a first band, a second band width of a second band, in response to the detection of a false contour between the first band and the second band, wherein the first band and the second band are adjacent to each other in the target arrangement; and
   D) performing pixel interpolation processing on at least a part of pixels in the second band to remove the false contour.

2. The method of claim 1, wherein step B comprises:
   determining a target pixel in the target arrangement;
   performing windowing processing on the target arrangement with a false contour detection window to obtain a set of neighboring pixels adjacent to the target pixel;

determining a first difference parameter, wherein the first difference parameter indicates a degree of difference among individual pixels associated with the target pixel;

determining a second difference parameter, wherein the second difference parameter indicates a degree of overall difference within the set of neighboring pixels or a degree of overall difference between the set of neighboring pixels and another set of neighboring pixels adjacent to a pixel at a preceding false contour; and determining whether the target pixel is located at a false contour of the target arrangement, at least based on the first difference parameter and the second difference parameter.

3. The method of claim 2, wherein determining the first difference parameter comprises:

comparing between two neighboring pixels adjacent to the target pixel; or comparing between the target pixel and a next neighboring pixel of the target pixel in the target arrangement.

4. The method of claim 2, wherein determining the second difference parameter comprises:

comparing between all neighboring pixels before the target pixel in the set of neighboring pixels and all neighboring pixels after the target pixel in the set of neighboring pixels.

5. The method of claim 2, wherein determining the second difference parameter comprises:

comparing between a first cumulative value of all pixels in the set of neighboring pixels and a second cumulative value of all pixels in the set of neighboring pixels adjacent to the pixel at a preceding false contour.

6. The method of claim 2, wherein determining whether the target pixel is located at a false contour of the target arrangement, at least based on the first difference parameter and the second difference parameter comprises:

determining that the target pixel is located at a false contour of the target arrangement, when the first difference parameter falls within a first predetermined difference range and the second difference parameter falls within a second predetermined difference range.

7. The method of claim 2, wherein the false contour detection window is a window centered on the target pixel with a width of at least 5 pixels.

8. The method of claim 2, wherein step B comprises:

determining a third difference parameter, wherein the third difference parameter indicates a maximum difference value of the set of neighboring pixels; and determining whether the target pixel is located at a false contour of the target arrangement, based on the first difference parameter, the second difference parameter and the third difference parameter.

9. The method of claim 8, wherein determining whether the target pixel is located at a false contour of the target arrangement, based on the first difference parameter, the second difference parameter and the third difference parameter comprises:

determining that the target pixel is located at a false contour of the target arrangement, when the first difference parameter falls within a first predetermined difference range, the second difference parameter falls within a second predetermined difference range, and the third difference parameter does not exceed a predetermined difference threshold.

10. The method of claim 9, wherein the predetermined difference threshold is a self-adaptive threshold related to the target pixel.

11. The method of claim 1, wherein step C comprises:

setting the first band width of the first band as a prediction value of the second band width of the second band.

12. The method of claim 1, wherein step C comprises:

comparing the first band width with a reference band width;

setting the first band width as a prediction value of the second band width, when the first band width is larger than the reference band width; and setting an average value of the first band width and the reference band width as the prediction value of the second band width, when the first band width is not larger than the reference band width.

13. The method of claim 12, wherein the reference band width is the prediction value of the first band width.

14. The method of claim 11, wherein step B comprises:

performing windowing processing on the target arrangement with a false contour detection window to obtain a set of neighboring pixels adjacent to the target pixel; and determining a second difference parameter, wherein the second difference parameter indicates a degree of overall difference within the set of neighboring pixels; and step C further comprises:

limiting a prediction value of the second band width based on the second difference parameter.

15. The method of claim 11, wherein step C further comprises:

correcting a prediction value of the second band width with respective band widths of two bands in two arrangements adjacent to the target arrangement in a non-target direction of the row direction and column direction, wherein the two bands correspond to the first band in the target direction.

16. The method of claim 12, wherein step B comprises:

performing windowing processing on the target arrangement with a false contour detection window to obtain a set of neighboring pixels adjacent to the target pixel; and determining a second difference parameter, wherein the second difference parameter indicates a degree of overall difference within the set of neighboring pixels; and step C further comprises:

limiting a prediction value of the second band width based on the second difference parameter.

17. The method of claim 12, wherein step C further comprises:

correcting a prediction value of the second band width with respective band widths of two bands in two arrangements adjacent to the target arrangement in a non-target direction of the row direction and column direction, wherein the two bands correspond to the first band in the target direction.

18. The method of claim 1, wherein the first band starts from a false contour or an image edge.

19. The method of claim 1, wherein the interpolation processing includes interpolation smoothing filtering processing.

20. The method of claim 19, wherein at least a part of pixels within the second band start from the target pixel but do not exceed ¾ of the prediction value of the second band width.

21. The method of claim 1, wherein after step D, the method further comprises:

performing adjustment processing on interpolated pixels so that the difference between each interpolated pixel and a pixel before the interpolated pixel in the target arrangement does not exceed a predetermined difference threshold.

22. The method of claim 21, wherein the predetermined difference threshold is a self-adaptive threshold.

23. The method of claim 21, wherein in the step of the adjustment processing, applying different predetermined difference thresholds to pixels located in a smooth area of the target image and pixels located in a non-smooth area of the target image.

24. A non-transitory computer-readable storage medium storing one or more executable instructions, wherein the one or more executable instructions, when executed by one or more processors, cause the one or more processors to perform a method for removing false contours from a target image, wherein the method comprises:
   A) receiving the target image having a two-dimensional pixel array arranged in rows and columns;
   B) performing a false contour detection on a target arrangement of the target image according to a target direction, wherein the target direction is one of the row direction or the column direction of the target image;
   C) predicting, based on at least a first band width of a first band, a second band width of a second band, in response to the detection of a false contour between the first band and the second band, wherein the first band and the second band are adjacent to each other in the target arrangement; and
   D) performing pixel interpolation processing on at least a part of pixels in the second band to remove the false contour.

25. A device designed for removing false contours from a target image, which is characterized in that the device comprises a non-transitory computer-readable storage medium storing one or more executable instructions, wherein the one or more executable instructions, when executed by one or more processors, cause the one or more devices to execute the following steps:
   A) receiving the target image having a two-dimensional pixel array arranged in rows and columns;
   B) performing a false contour detection on a target arrangement of the target image according to a target direction, wherein the target direction is one of the row direction or the column direction of the target image;
   C) predicting, based on at least a first band width of a first band, a second band width of a second band, in response to the detection of a false contour between the first band and the second band, wherein the first band and the second band are adjacent to each other in the target arrangement; and
   D) performing pixel interpolation processing on at least a part of pixels in the second band to remove the false contour.

* * * * *